(12) United States Patent
Roth et al.

(10) Patent No.: US 9,464,879 B2
(45) Date of Patent: Oct. 11, 2016

(54) BARREL MEASURING DEVICE

(71) Applicant: Buhler Inc., Plymouth, MN (US)

(72) Inventors: Daniel Urs Roth, Plymouth, MN (US); Dominique Salesuis Akermann, Maple Grove, MN (US); Chad William Myers, St. Peter, MN (US)

(73) Assignee: BUHLER, INC., Plymouth, MN (US)

( * ) Notice: Subject to any disclaimer, the term of this patent is extended or adjusted under 35 U.S.C. 154(b) by 210 days.

(21) Appl. No.: 13/931,068

(22) Filed: Jun. 28, 2013

(65) Prior Publication Data

US 2015/0000151 A1    Jan. 1, 2015

(51) Int. Cl.
*G01B 5/12*    (2006.01)

(52) U.S. Cl.
CPC ........................................ *G01B 5/12* (2013.01)

(58) Field of Classification Search
CPC ............. G01B 5/12; G01B 5/08; G01B 3/28
USPC ...................... 33/542, 542.1, 543, 544, 544.5
See application file for complete search history.

(56) References Cited

U.S. PATENT DOCUMENTS

| | | | |
|---|---|---|---|
| 2,451,600 A | | 10/1948 | Woodcock |
| 2,810,203 A | * | 10/1957 | Bachofer ..................... 33/544.2 |
| 3,251,134 A | | 5/1966 | Wojcik |
| 3,808,696 A | * | 5/1974 | Possati ......................... 33/544.5 |
| 3,995,373 A | | 12/1976 | Brumbelow |
| 4,006,530 A | | 2/1977 | Nicolas |
| 4,087,918 A | * | 5/1978 | Schmid et al. ................. 33/542 |
| 4,228,593 A | | 10/1980 | Frank et al. |
| 4,348,814 A | * | 9/1982 | Possati et al. ............. 33/501.09 |
| 4,382,338 A | * | 5/1983 | Possati et al. ............. 33/501.09 |
| 4,403,860 A | * | 9/1983 | Pryor ............................. 356/615 |
| 4,407,071 A | | 10/1983 | Boeder et al. |
| 4,536,960 A | | 8/1985 | Muti |
| 4,559,709 A | | 12/1985 | Beseme et al. |
| 4,787,149 A | * | 11/1988 | Possati et al. ................... 33/542 |
| 4,839,955 A | * | 6/1989 | Vannier ....................... 29/402.08 |
| 5,294,923 A | * | 3/1994 | Juergens et al. ........... 340/854.9 |
| 5,299,359 A | | 4/1994 | Estes et al. |
| 5,377,421 A | * | 1/1995 | Isler ................................ 33/542 |
| 5,576,826 A | * | 11/1996 | Hamar .......................... 356/138 |
| 5,816,699 A | | 10/1998 | Keith et al. ..................... 366/84 |
| 5,933,231 A | * | 8/1999 | Bieman et al. ............. 356/241.1 |
| 6,647,637 B2 | | 11/2003 | Lechen |

(Continued)

FOREIGN PATENT DOCUMENTS

WO      WO8502674 A1      6/1985

OTHER PUBLICATIONS

Yoshizawa, T. et al., Optical Inner Profile Measurement for Pipes and Tubes, © 2011 Tech Science Press, SL, vol. 6, No. 1, pp. 1-7, 2011.

*Primary Examiner* — Christopher Fulton
(74) *Attorney, Agent, or Firm* — Faegre Baker Daniels LLP

(57) ABSTRACT

A measuring device includes a housing and a caliper positioned inside the housing. The housing has a proximal end and a distal end and defines an axis from the proximal end to the distal end. The caliper includes a first measurement probe extending out of the housing in a first direction, a second measurement probe extending out of the housing in a second direction that is substantially opposite of the first direction, and measurement circuitry configured for transmitting a measurement signal based on the relative positions of the first and second measurement probes.

28 Claims, 5 Drawing Sheets

(56) References Cited

U.S. PATENT DOCUMENTS

| | | |
|---|---|---|
| 6,901,675 B2 * | 6/2005 | Edwards et al. ............... 33/542 |
| 7,131,210 B2 | 11/2006 | Fredette et al. |
| 7,347,002 B2 | 3/2008 | Foege |
| 7,389,828 B2 | 6/2008 | Ritter et al. |
| 8,235,144 B2 | 8/2012 | Rasheed |
| 2005/0198848 A1 * | 9/2005 | Takai ............................. 33/542 |
| 2009/0205215 A1 * | 8/2009 | Esslinger ..................... 33/542.1 |
| 2012/0308174 A1 | 12/2012 | Head |

* cited by examiner

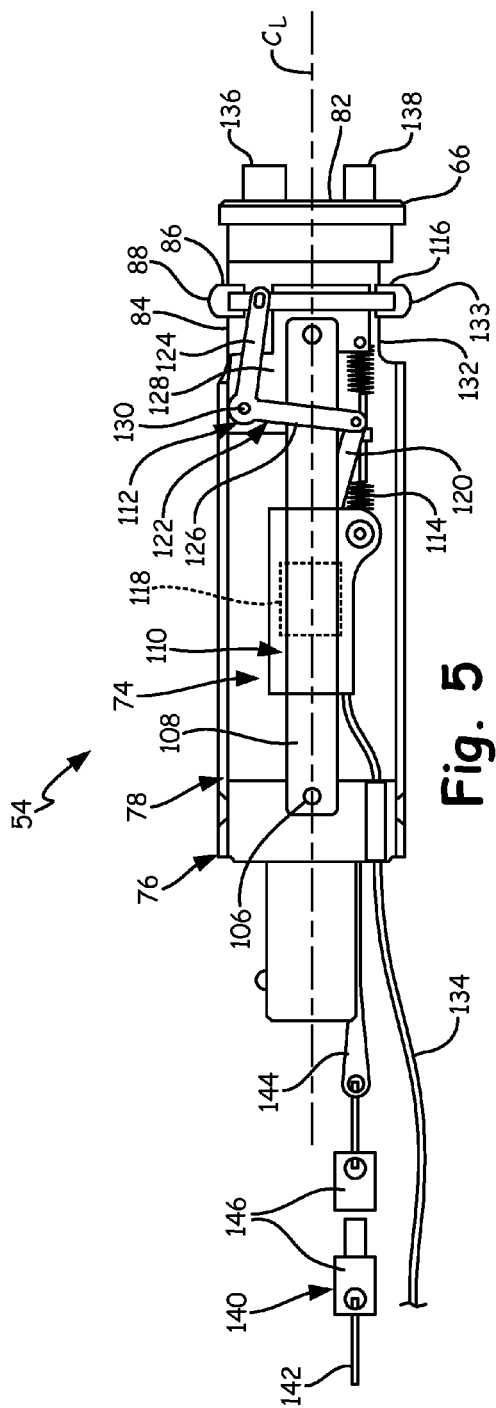

BARREL MEASURING DEVICE

TECHNICAL FIELD

The present invention relates to measuring devices, and in particular, to devices for measuring bore diameter of barrels such as in screw extruders.

BACKGROUND

Food processing plants rely on a variety of industrial food processing equipment such as screw extruders. For example, some food processing plants use one or more screw extruders to process corn, wheat, rice, or other grains to form pasta or cereals. Such screw extruders can include a screw that turns within a barrel to convey, mix, and compress the food as it moves through the screw extruder.

During this process, an inner surface of the barrels can become worn and damaged due to a combination of heat and the abrasive properties of food granules under high pressure. If the inner surface of the barrels become so worn so as to substantially increase bore diameter, quality, consistency, and even flavor of the food can be reduced. Barrels can be repaired or replaced, however, it can be difficult and time consuming to determine whether and when a particular barrel requires replacement.

SUMMARY

According to the present invention, a measuring device includes a housing and a caliper positioned inside the housing. The housing has a proximal end and a distal end and defines an axis from the proximal end to the distal end. The caliper includes a first measurement probe extending out of the housing in a first direction, a second measurement probe extending out of the housing in a second direction that is substantially opposite of the first direction, and measurement circuitry configured for transmitting a measurement signal based on the relative positions of the first and second measurement probes.

Another embodiment is a method of measuring bore diameter in a screw extruder. The method includes exposing a bore of an extruder barrel that is defined by an inner surface of the extruder barrel, removing an extruder screw from the bore of the extruder barrel, and inserting a measuring device into the bore. The measuring device includes a housing and a caliper positioned inside the housing. The caliper includes a first measurement probe extending a first direction to contact the inner surface of the extruder barrel, a second measurement probe extending in a second direction that is substantially opposite of the first direction to contact the inner surface of the extruder barrel, and measurement circuitry configured for transmitting a measurement signal based on the relative positions of the first and second measurement probes. Diameter of the bore is measured along a length of the bore via the measuring device.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 5 is a side partial sectional view of the tool assembly.
FIG. 6 is a side partial sectional view of the tool assembly with probe extensions.

DETAILED DESCRIPTION

Figure 1:
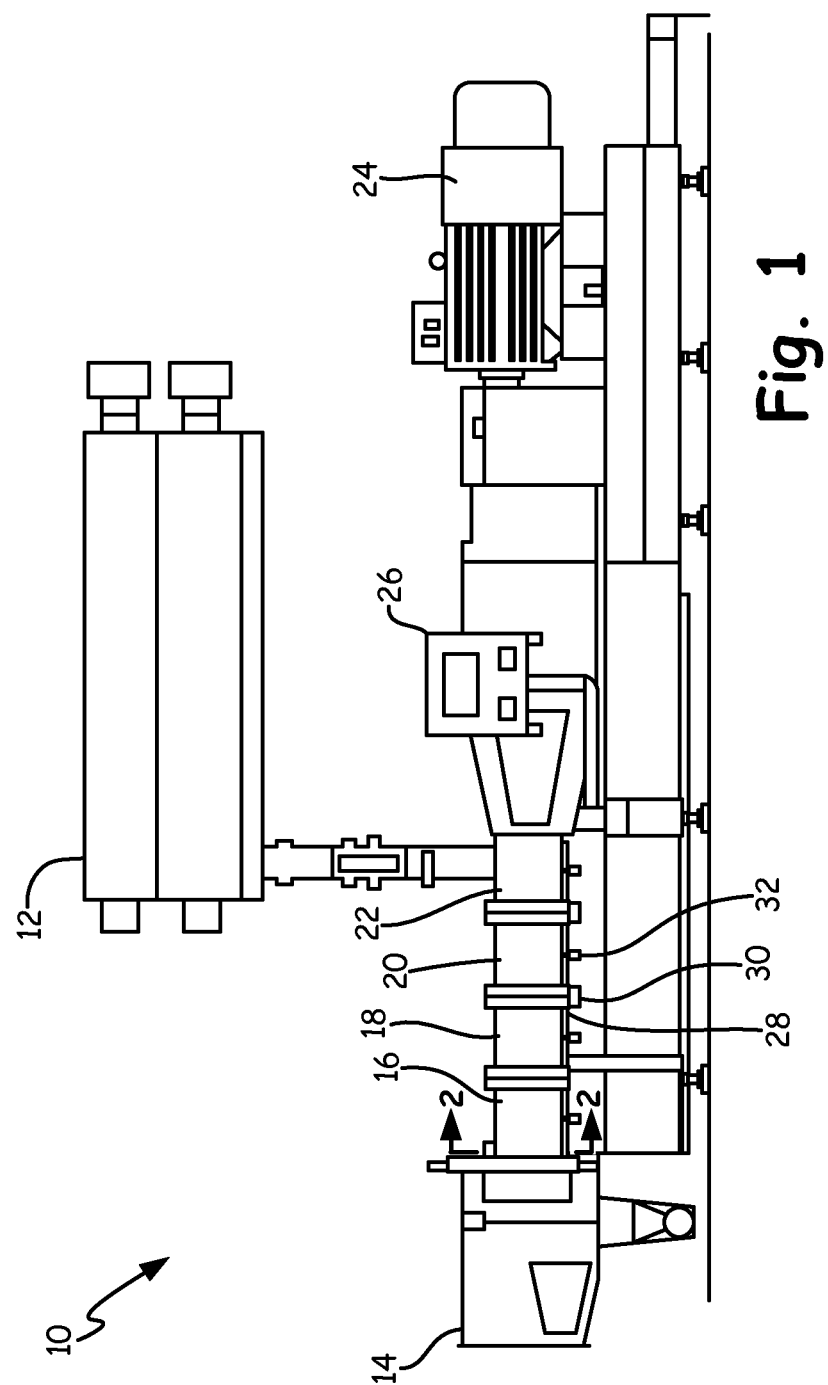
FIG. 1 is a side schematic view of a screw extruder.

FIG. 1 is a side schematic view of a screw extruder 10 on which a barrel measuring device in accordance with the invention can be used. The screw extruder 10 is a twin-screw extruder for processing food such as pasta or cereal. The screw extruder 10 includes a preconditioner 12, a nozzle end 14, a series of barrels 16, 18, 20, and 22, a drive mechanism 24, and a controller 26. Food is supplied from a feeder (not shown) to the preconditioner 12, then through the barrels 16, 18, 20, and 22 to be dispensed at the nozzle end 14. The barrels 16, 18, 20, and 22 are connected in series via a plurality of flanges 28. Two screws (not shown) extend through the barrels 16, 18, 20, and 22 to convey, mix, and compress the food as it moves from the feeder to the nozzle end 14. The drive mechanism 24 drives rotation of the screws. The nozzle end 14 can include a cutter (not shown) that cuts the food to length as it is extruded from the screw extruder 10.

One or more ports 30 are positioned at a bottom of one or more of the flanges 28 for circulating a fluid, such as water, glycol, or steam, for heating and cooking the food in the barrels 16, 18, 20, and 22. One or more sensors 32, such as temperature sensors and pressure sensors, extend into one or more of the barrels 16, 18, 20, and 22. The sensors 32 are connected to the controller 26 to provide temperature, pressure or other data that the controller 26 can use to control operation of the screw extruder 10.

In operation, the screw extruder 10 runs substantially continuously, processing the food into pasta, cereal, or another food product. The screw extruder 10 can also be periodically shut down for cleaning and/or maintenance. During maintenance, the nozzle end 14 can be removed from the screw extruder 10, thus exposing an end of the barrel 16 as shown in FIG. 2.

Figure 2:
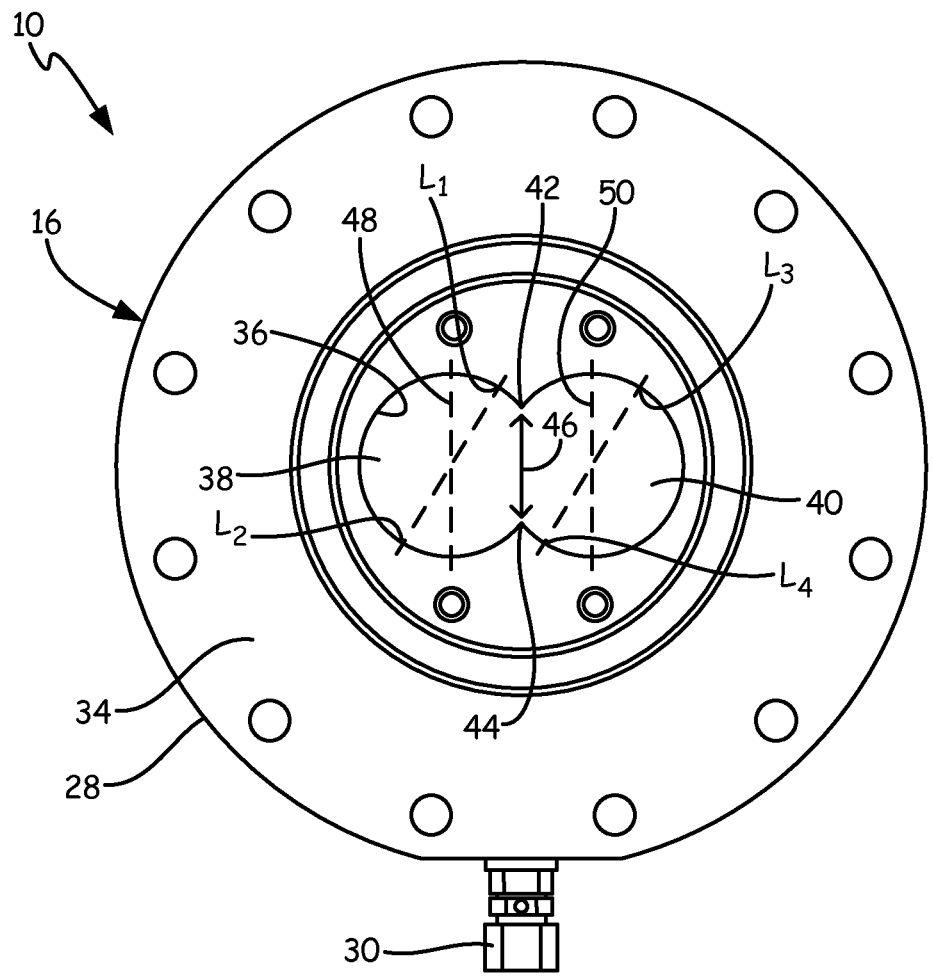
FIG. 2 is a sectional view of a barrel of the screw extruder taken along line 2-2 of FIG. 1.

FIG. 2 is a sectional view of an end 34 of the barrel 16 of the screw extruder 10 taken along line 2-2 of FIG. 1. The barrel 16 has an inner surface 36 defining left and right bores 38 and 40. The left and right bores 38 and 40 are adjacent to one-another and are each substantially cylindrical except where the left bore 38 meets the right bore 40. The barrel 16 defines ridges 42 and 44 with a gap 46 there-between. The gap 46 fluidically connects the left bore 38 to the right bore 40. In operation, left and right screws (not shown) are positioned in the left and right bores 38 and 40, respectively, with the left and right screws overlapping across the gap 46. The left and right screws can be removed from the left and right bores 38 and 40 to allow for cleaning and inspection of the inner surface 36.

When the screws are turning in the left and right bores 38 and 40, the inner surface 36 can become worn and damaged due to a combination of heat and the abrasive properties of food granules under high pressure. This wear can increase bore diameter of the left and right bores 38 and 40 which can reduced quality, consistency, and even flavor of food processed in the screw extruder 10. For example, in some extruder applications, if a gap between either of the left and right screws and the inner surface 36 exceeds a value such as one millimeter (mm), properties of the resulting food product can be negatively changed in a way that is noticeable to consumers.

The inner surface 36 may not necessarily wear evenly over the entire inner surface 36. For example, in one embodiment, the inner surface 36 can exhibit the greatest wear at wear locations $L_1$, $L_2$, $L_3$, and $L_4$. The wear locations $L_1$ and $L_2$ are angled with respect to a vertical axis 48 of the left bore 38 by between 10 degrees and 50 degrees in a clockwise direction as shown in FIG. 2. The wear locations $L_3$ and $L_4$ are angled with respect to a vertical axis 50 of the right bore 40 by between 10 degrees and 50 degrees in the clockwise direction as shown in FIG. 2. Because the wear locations $L_1$, $L_2$, $L_3$, and $L_4$ are angled with respect to the vertical axes 48 and 50, it can be important to inspect the inner surface 36 for wear at locations that are angled with respect to the vertical axes 48 and 50.

Moreover, the inner surface 36 can wear at different rates for different barrels 16, 18, 20, and 22 (shown in FIG. 1). In one embodiment, pressure can increase from the barrel 22 to the barrel 16, causing the barrel 16 to wear more quickly and the barrel 22 to wear less quickly. Thus, the barrel 16 can require frequent repair or replacement while the barrels 18, 20, and 22 can require repair or replacement less frequently. Although the barrels 18, 20, and 22 may require repair or replacement less frequently, it is not necessarily less important when repair or replacement does become necessary.

Figure 3:
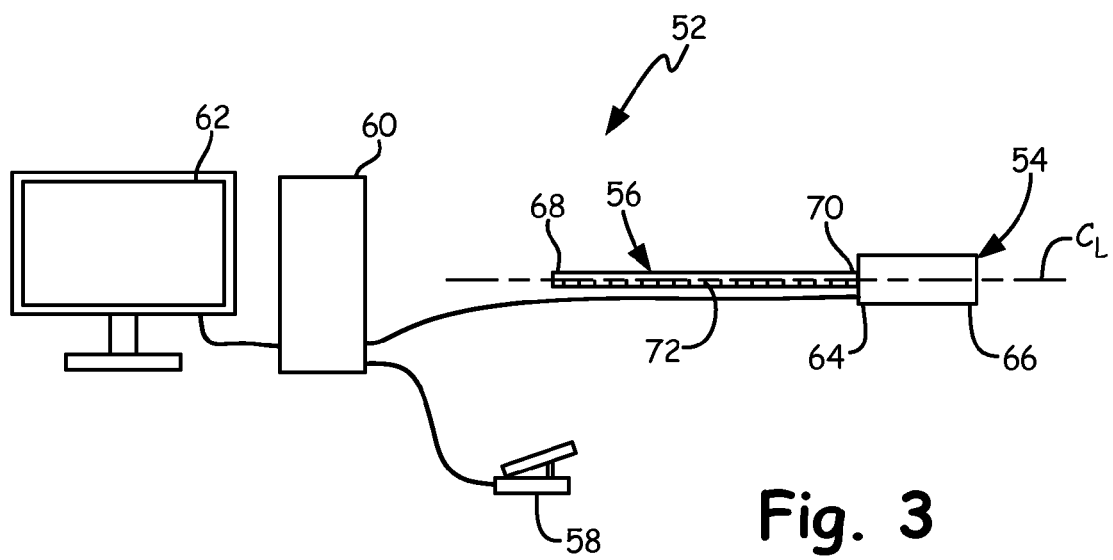
FIG. 3 is a schematic system view of a measuring device.

FIG. 3 is a schematic system view of a measurement device 52. Measurement device 52 includes a tool assembly 54, a shaft 56, a switch 58, a computer 60, and a monitor 62. The tool assembly 54 is a measurement tool for measuring bore diameter of a barrel, such as diameter of the left and right bores 38 and 40 of the barrels 16, 18, 20, and 22 of the screw extruder 10 (shown in FIGS. 1 and 2). The tool assembly 54 has a proximal end 64 and a distal end 66. The shaft 56 has a proximal end 68 and a distal end 70 and defines a centerline axis $C_L$ from the proximal end 68 to the distal end 70. The proximal end 64 of the tool assembly 54 is mounted to the distal end 70 of the shaft 56. The centerline axis $C_L$ is also a centerline axis of the tool assembly 54. Measurement indicia 72 extends along a length of the shaft 56 between the proximal end 68 and the distal end 70. The measurement indicia 72 is a series of markings, numbers, letters, and/or other indicia at regular distance intervals along a length of the shaft 56, such as a ruler, tape measure, or other scale. In operation, a user can hold the proximal end 68 of the shaft 56 to direct and insert the tool assembly 54 into the one of the left and right bore 38 and 40. The measurement indicia 72 can provide an indication of how far the tool assembly 54 is inserted in one of the left and right bores 38 and 40.

The tool assembly 54 is connected in communication with the computer 60, which is also connected in communication with the monitor 62 and the switch 58. In the illustrated embodiment, the computer 60 is electrically connected to the tool assembly 54, the monitor 62, and the switch 58 via a plurality of cables or wires. In alternative embodiments, the computer 60 can be wirelessly connected to one or more of the tool assembly 54, the monitor 62, and the switch 58.

In the illustrated embodiment, the computer 60 is a personal computer including a processor and one or more digital storage media. In alternative embodiments, the computer 60 can be a laptop computer, a computer workstation, a personal computer, a personal digital assistant, a cellular phone, a mobile phone, a smart phone, another telephone, a digital tablet, an internet appliance, or virtually any device suitable for communicating with the tool assembly 54. In the illustrated embodiment, the computer 60 is a component that is separate and distinct from the tool assembly 54, the monitor 62, and the switch 58. In alternative embodiments, the computer 60 can be integrated with one or more of the tool assembly 54, the monitor 62, and the switch 58, such as in a common housing with common circuitry.

In operation, the computer 60 can receive measurement signals from the tool assembly 54 and send output signals to the monitor 62 to drive the monitor 62 to display an indication of bore diameter as measured by the tool assembly 54. The computer 60 can drive the monitor 62 to display a plurality of indications of bore diameter at a plurality of discrete points along a length of one of the left and right bores 38 and 40 as the tool assembly 54 is pushed or pulled along one of the left and right bores 38 and 40. A user can manually activate the switch 58 to indicate which discrete points should be measured. The computer 60 can then store data for and drive the monitor 62 to display those indications of bore diameter. The user can actuate the switch 58 periodically at intervals according to the measurement indicia 72 on the shaft 56. Alternatively, the user can actuate the switch 58 at times or intervals which the user deems appropriate.

In the illustrated embodiment, the switch 58 is a foot actuated pedal switch. Because the switch 58 is foot actuated, a users hands can be left free to manipulate the shaft 56 and the tool assembly 54. In alternative embodiments, the switch 58 can be a device actuated by hand, such as a keyboard connected to the computer 60. In further alternative embodiments, the discrete points for recording indications of bore diameter can be determined automatically. For example, the computer 60 can automatically record indications of bore diameter at regular chronological intervals (such as, for example, every millisecond) as the tool assembly 54 slides along a length of one of the left and right bores 38 and 40. Alternatively, the computer 60 can automatically record indications of bore diameter at regular distance intervals as the tool assembly 54 slides along a length of one of the left and right bores 38 and 40.

Figure 4:
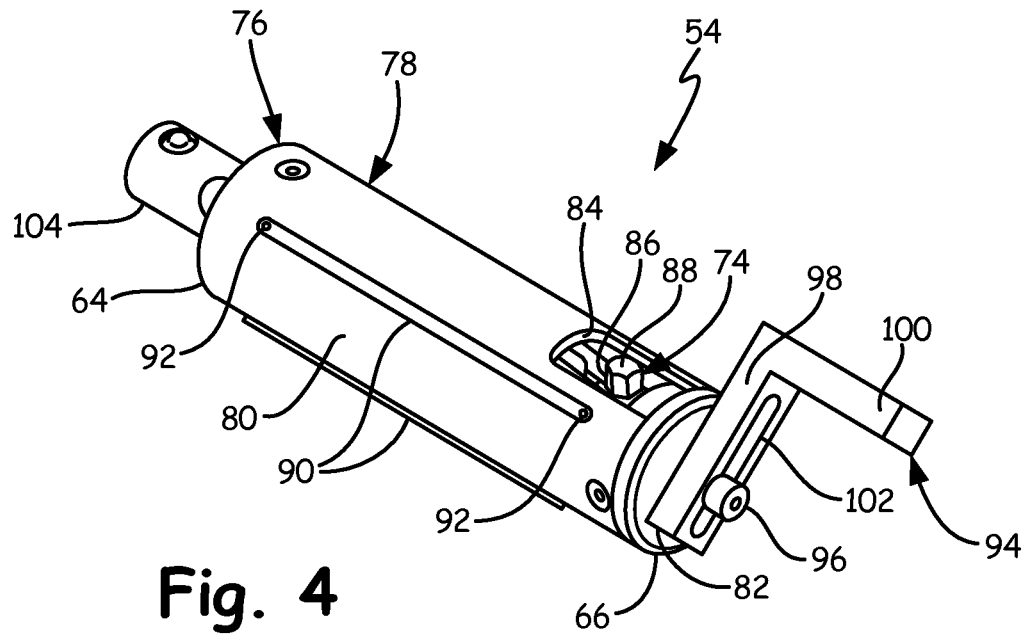
FIG. 4 is a perspective view of a tool assembly for use in the measuring device of FIG. 3.

FIG. 4 is a perspective view of the tool assembly 54, which includes a caliper 74 positioned in an internal cavity of a housing 76. The housing 76 includes a shell 78 shown as having a substantially cylindrical outer surface 80 that extends circumferentially around the tool assembly 54 and has an end cap 82 attached to the shell 78 at the distal end 66 of the tool assembly 54. The shell 78 defines a first probe port 84 extending through the shell 78 near the distal end 66. The caliper 74 has a first measurement probe 86 extending radially outward of the housing 76, through the first probe port 84. The first measurement probe 86 has a first probe tip 88 for contacting a discrete point of contact on the inner surface 36 of the barrels 16, 18, 20, and 22 (shown in FIG. 2).

Gliders 90 are mounted on the outer surface 80 of the housing 76 via threaded fasteners 92. Two, three, or four or more gliders 90 can be positioned circumferentially around the shell 78 to provide sliding contact against the inner surface 36 of the barrels 16, 18, 20, and 22 as the tool assembly 54 is slid along the inner surface 36 to measure bore diameter. The gliders 90 are removably mounted and are interchangeable between larger and smaller gliders 90. The gliders 90 can be changed to increase or decrease an effective diameter of the tool assembly 54 so as to better fit in a variety of barrels having different bore diameters. Thus, the interchangeability of the gliders 90 can allow a single tool assembly 54 to be configured for use in multiple different screw extruders (such as the screw extruder 10 of FIG. 1) having different bore diameters. In various embodiments, the gliders 90 can be sized and shaped differently than as illustrated.

In the illustrated embodiment, the tool assembly also includes an adjustable tip glider 94 connected to the end cap 82 via a threaded fastener 96. The adjustable tip glider 94 is substantially L-shaped, having a radially extending leg 98 and an axially extending leg 100 connected perpendicular to and at a radially outer end of the radially extending leg 98. The threaded fastener 96 extends through a slot 102 in the radially extending leg 98. The threaded fastener 96 can be loosened to allow the adjustable tip glider 94 to slide radially inward or outward to fit a given bore diameter. The threaded fastener 96 can then be tightened to fix the adjustable tip glider 94 at a desired distance. The axially extending leg 100 can provide sliding contact against the inner surface 36 as the tool assembly 54 is slid along the inner surface 36 to measure bore diameter. In various embodiments, the tool assembly 54 can include the gliders 90, the adjustable tip glider 94, both the gliders 90 and the adjustable tip glider 94, or neither the gliders 90 nor the adjustable tip glider 94.

A stub shaft 104 extends in a proximal direction from the proximal end 64. The stub shaft 104 removably connects to the shaft 56 (shown in FIG. 3). In alternative embodiments, the stub shaft 104 and/or the shaft 56 can be omitted from the tool assembly 54.

FIG. 5 is a side, partial sectional view of the tool assembly 54. The shell 78 is shown in section so as to expose the caliper 74. The caliper 74 is movably mounted within the housing 76 so as to float in the housing 76 such that the caliper 74 is self-centering. In the illustrated embodiment, the caliper 74 is pivotably mounted about a pivot point 106, which is rigidly mounted to the housing 76. Thus, the caliper 74 can pivot with respect to the housing 76. In an alternative embodiment, the caliper 74 can be movably mounted to the housing 76 via another mechanism so long as the caliper 74 can slide in a radial direction with respect to the centerline axis $C_L$.

The caliper 74 includes a caliper shaft 108, a caliper slider 110, a linkage 112, a spring 114, the first measurement probe 86, and a second measurement probe 116. The caliper shaft 108 is pivotably mounted to the pivot point 106 at a proximal end of the caliper shaft 108. The caliper slider 110 is slidably mounted to the caliper shaft 108 so as to slide along the caliper shaft in a substantially axial direction with respect to the centerline axis $C_L$. The caliper slider 110 includes measurement circuitry 118 configured for measuring relative movement between the caliper slider 110 and the caliper shaft 108 and for transmitting a measurement signal based upon that relative movement. In one embodiment, the caliper shaft 108 and the caliper slider 110 can be a series Q15 ID: 812-100 digital scale unit sold by Guilin Guanglu Measuring Instruments Co., Ltd of Guilin, Guangxi Province, China (doing business as TRESNA®). In other embodiments, the caliper shaft 108 and the caliper slider 110 can be another electronic scale or caliper device suitable for the application.

The linkage 112 is a bellcrank linkage that include links 120 and 122. The linkage 112 converts radial motion of the first and second measurement probes 84 and 116 into axial motion of the caliper slider 110. The link 120 has a first end pivotably connected to the caliper slider 110 and a second end pivotably connected to a first end of the link 122. The link 122 is substantially L-shaped, having a leg 124 substantially perpendicular to a leg 126. The link 122 is pivotably connected to a mounting flange 128 at a pivot point 130 located at an intersection between the legs 124 and 126. The link 122 has a second end pivotably connected to the first measurement probe 86. Thus, the leg 124 is pivotably connected to the link 120 and the leg 126 is pivotably connected to the first measurement probe 86.

The mounting flange 128 is rigidly mounted to the caliper shaft 108 and the second measurement probe 116 is rigidly mounted to the mounting flange 128. Thus, the second measurement probe 116 is effectively rigidly mounted to the caliper shaft 108 via the mounting flange 128. The first measurement probe 86 is slidably mounted to the second measurement probe 116 so as to slide with respect to the second measurement probe 116 in a radial direction with respect to the centerline axis $C_L$. The spring 114 is mounted in tension with a first end connected to the caliper slider 110 and a second end connected to the mounting flange 128. The spring 114 biases the caliper slider 110 toward the distal direction, which exerts a force on the linkage 112 causing the linkage 112 to bias the first measurement probe 86 away from the second measurement probe 116.

The first measurement probe 86 extends out through the first probe port 84 in a first radial direction and the second measurement probe 116 extends out through a second probe port 132 in a second radial direction that is substantially opposite of the first radial direction. The second probe port 132 is positioned substantially opposite the first probe port 84 so as to allow the second measurement probe 116 to extend through the shell 78. The first probe tip 88 of the first measurement probe 86 extends out of the shell 78 to contact a first discrete point of contact on an inner surface of an object and the second measurement probe 116 has a second probe tip 133 extending out of the shell 78 to contact a second discrete point of contact on the inner surface of the object, such as the barrels 16, 18, 20, and 22. A change in diameter of the inner surface of that object causes a change in the relative position of the first and second measurement probes 86 and 116. The linkage 112 converts the change in relative positions between the first and second measurement probes 86 and 116 into axial motion by the caliper slider 110, which is sensed and transmitted as a measurement signal by the measurement circuitry 118. In the illustrated embodiment, the caliper slider 110 is connected to a data cable 134 which transmits the measurement signal to the computer 60 (shown in FIG. 3). In alternative embodiments, the measurement circuitry 118 can transmit the measurement signal wirelessly and/or can store measurement data in memory in the measurement circuitry 118.

In some embodiments, the tool assembly 54 can include one or more tools in addition to the caliper 74. In the illustrated embodiment, the tool assembly 54 includes a light emitting diode (LED) 136 and a digital camera 138, each mounted on the end cap 82 at the distal end 66 of the housing 76. The digital camera 138 can be mounted in an alignment suitable to image the inner surface 36 of the barrels 16, 18, 20, and 22 by taking video and/or still images. The LED 136 can illuminate the inner surface 36 to improve image quality by the digital camera 138. In other embodiments, the LED 136 and the digital camera 138 can be omitted from the tool assembly 54.

A lanyard 140 extends through the housing 76 at the proximal end 64 and attaches to the caliper slider 110. A user can pull on the lanyard 140 to slide the caliper slider 110 in the proximal direction, which causes the linkage 112 to retract the first measurement probe 86 radially inward toward the second measurement probe 116. In applications where the inner surface 36 is particularly rough, the first measurement probe 86 and/or the second measurement probe 116 can become stuck in a cavity in the inner surface 36, causing the tool assembly 54 to become stuck. By pulling the lanyard 140, the first measurement probe 86 and/or the second measurement probe 116 can be refracted out of the cavity and the tool assembly 54 can become unstuck. In the illustrated embodiment, the lanyard 140 includes first and second cables 142 and 144, connected by a connector 146. The connector 146 is detachable, allowing the first cable 142 to be detached from the second cable 144 for storage.

The tool assembly 54 is shown in FIG. 5 without the gliders 90 or the adjustable tip glider 94 (shown in FIG. 4). In various embodiments, one or more of the gliders 90 and the adjustable tip glider 94 can be included.

The housing 76 can guide and provide support for the caliper 74 during measurement of the barrels 16, 18, 20, and 22. In the illustrated embodiment, the housing 76 also substantially encloses the caliper 74, except for the first and second measurement probes 86 and 116 which extend out of the housing 76. In alternative embodiments, the housing 76 need not substantially enclose the caliper 74. For example, the housing 76 can be a substantially open frame that provides support for the caliper 74 as well as the gliders 90 and/or the adjustable tip glider 94.

FIG. 6 is a side partial sectional view of the tool assembly 54 with probe extensions 148 and 150. The probe extension 148 is a removable extension for extending the length of the first measurement probe 86 in the first radial direction. The probe extension 150 is a removable extension for extending the length of the second measurement probe 116 in the second radial direction. The probe extensions 148 and 150 can be threaded to allow for threaded connection to and disconnection from the caliper 74. The probe extensions 148 and 150 change a distance between the first and second probe tips 88 and 133 of the first and second measurement probes 86 and 116 and allow the first and second measurement probes 86 and 116 to extend further out of the housing 76, thus increasing the effective diameter of the caliper 74. The tool assembly 54 can have a number of changeable extensions of differing lengths, allowing the tool assembly 54 to be modified to fit barrels of different diameters. Adjusting diameter of the caliper 74 via the probe extensions 148 and 150 can allow the caliper slider 110, the linkage 112, and the probes 86 and 116 to have a relatively small range of motion while still allowing the tool assembly 54 to be used with barrels of different diameters. For example, in one embodiment the first and second measurement probes 86 and 116 can have a range of motion of 12 millimeters and the tool assembly 54 can be resized for use in bore diameters ranging from 62 millimeters to 125 millimeters. In other embodiments, the tool assembly can be sized to fit in smaller or larger bore diameters.

The probe extensions 148 and 150 can be used in conjunction with different sizes of the gliders 90 (shown in FIG. 4) to better fit different barrels having different bore diameters. The probe extensions 148 and 150 can also be used in conjunction with the adjustable tip glider 94 (shown in FIG. 4) to better fit different barrels having different bore diameters.

In a measuring operation, the measurement device 52 (shown in FIG. 3) can be used to measure bore diameter of the screw extruder 10 (shown in FIGS. 1 and 2). A user can first remove the nozzle end 14 from the screw extruder 10 to expose the left and right bores 38 and 40 of the barrels 16, 18, 20, and 22. The user can then remove left and right screws from the left and right bores 38 and 40. Next, the tool assembly 54 of the measurement device 52 can be inserted into one of the bores (for example, the left bore 38). Diameter of the left bore 38 can then be measured along a length of the left bore via the measurement device 52. Diameter of the left bore 38 can be measured as the user pushes the tool assembly 54 into the left bore and/or as the user pulls the tool assembly 54 back through the left bore 38.

The tool assembly 54 of the measurement device 52 can be angled such that the first and second measurement probes 86 and 116 are angled with respect to the vertical axis 48 by between 10 degrees and 50 degrees as the tool assembly is moved along a length of the left bore 38 and as diameter of the left bore 38 is measured. By angling the tool assembly 54 in that manner, the first and second measurement probes 86 and 116 can contact the wear locations $L_1$ and $L_2$ to obtain diameter readings at those wear locations $L_1$ and $L_2$. The tool assembly 54 can then transmit one or more measurement signals back to the computer 60, to be stored as data on the computer 60 and/or displayed by the monitor 62 as a chart, a table, a graph, and/or other indicia of bore diameter. The computer 60 and monitor 62 can automatically graph bore diameter based upon the measurement signals. By angling the tool assembly 54 to contact the wear locations $L_1$ and $L_2$, in some applications the measurement device 52 can measure bore diameter in only a single pass per bore.

After diameter of the left bore 38 has been measured, the tool assembly 54 can be removed from the left bore 38 and then inserted into the right bore 40. The measurement device 52 can then measure bore diameter of the right bore 40 in a similar manner as that described above for the left bore 38.

The measurement device 52 can measure diameter of the left bore 38 and the right bore 40 while the barrels 16, 18, 20, and 22 remain connected. This can save time in measuring the left bore 38 and the right bore 40 by not having to disassemble and reassemble the barrels 16, 18, 20, and 22 for measurement. If measured bore diameter is within acceptable limits, then the screw extruder 10 can be reassembled by inserting the left and right screws into the left and right bores 38 and 40 and reattaching the nozzle end 14. The screw extruder 10 can then be put back into operation processing food. Thus, the measurement device 52 can allow for a measurement process that is relatively quick, such as about two hours. A relatively quick measurement process can allow the screw extruder 10 to be measured and returned to service with less down time.

If, however, bore diameter of one or both of the left and right bores 38 and 40 is outside of acceptable limits, then maintenance can be required. For example, if it is determined that bore diameter of the left bore 38 exceeds a threshold in the barrel 16, the barrel 16 can be detached from the barrel 18 and replaced with a new barrel. The remaining barrels 18, 20, and 22 need not be replaced so long as bore diameter is within acceptable limits within the barrels 18, 20, and 22. Alternatively, if the bore diameter is within acceptable limits within in the barrels 16, 18, and 20 but outside of acceptable limits in the barrel 22, the barrel 22 can be detached and replaced. Thus, the barrels 6, 18, 20, and 22 can be detached for repair or replacement but need not be detached for measurement.

After bore diameter of the screw extruder 10 has been measured and the tool assembly 54 has been removed from the screw extruder 10, the measurement device 52 then be used to measure bore diameter of a bore of a second screw extruder (not shown) having a bore with a second, different bore diameter. Prior to inserting the tool assembly into the bore of the second screw extruder, the tool assembly 54 can be resized for the different bore diameter. The gliders 90 can be removed and replaced with larger or smaller gliders. If the extensions 148 and 150 are on the caliper 74, the extensions 148 and 150 can be removed and replaced with larger or smaller extensions. If there are no extensions on the caliper 74, then the extensions 148 and 150 can be added to the caliper 74. The tool assembly 54 can then be inserted into the bore of the second screw extruder and the measurement device 52 can measure bore diameter of the second screw extruder in a similar manner as that described above for the screw extruder 10. This method can then be repeated for additional screw extruders having similar or varying bore diameters. Thus, the measurement device 52 having the tool assembly 54 can measure bore diameter of one or more screw extruders in a manner that is relatively efficient, reliable, and cost-effective.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A measuring device comprising:
    a housing having a proximal end and a distal end and defining an axis from the proximal end to the distal end;
    a caliper mounted for self-centering movement inside the housing, the caliper comprising:
        a first measurement probe extending out of the housing in a first direction;
        a second measurement probe extending out of the housing in a second direction that is substantially opposite of the first direction;
        a linkage coupled to the first and second measurement probes; and
        measurement circuitry coupled to the linkage and configured for transmitting a measurement signal based on the relative positions of the first and second measurement probes; and
    a cable for retracting the first and second measurement probes, the cable coupled to the caliper and extending from the housing.

2. The measurement device of claim 1, wherein the housing has a shell having a substantially cylindrical outer surface that extends circumferentially around the caliper, wherein the shell defines a first probe port positioned to allow the first measurement probe to extend radially outward through the shell and a second probe port positioned to allow the second measurement probe to extend radially outward through the shell.

3. The measurement device of claim 1, wherein the first measurement probe has a first point tip for contacting a first discrete point of contact on an inner surface of an object and the second measurement probe has a second point tip for contacting a second discrete point of contact on the inner surface of the object.

4. The measurement device of claim 1, wherein the caliper is mounted within the housing so as to be movable relative to the housing in a radial direction relative to the axis.

5. The measurement device of claim 1, and further comprising:
    a spring operably connected to the caliper so as to bias the second measurement probe away from the first measurement probe.

6. The measurement device of claim 1, wherein the caliper is pivotably mounted to the housing.

7. The measurement device of claim 1, wherein the caliper further comprises:
    a caliper shaft; and
    a caliper slider slidably mounted on the caliper shaft and coupled to the linkage.

8. The measurement device of claim 7, wherein the caliper further comprises a first changeable extension for extending a first length of the first measurement probe in the first direction and a second changeable extension for extending a second length of the second measurement probe in the second direction.

9. The measurement device of claim 7, wherein the caliper shaft is pivotably mounted to the housing.

10. The measurement device of claim 1, and further comprising:
    a monitor; and
    a computer in communication with the measurement circuitry and the monitor, wherein the computer receives the measurement signals from the measurement circuitry and sends output signals to the monitor to drive the monitor to display an indication of bore diameter as measured by the caliper.

11. The measurement device of claim 10, wherein the computer is configured to drive the monitor to display a plurality of indications of bore diameter at a plurality of discrete points along a length of a bore defined by a barrel.

12. The measurement device of claim 10, and further comprising:
    a switch in communication with the computer, wherein the computer records the indication of bore diameter as measured by the caliper in response to actuation of the switch.

13. The measurement device of claim 1, wherein the measuring device further comprises:
    a light emitting diode (LED) mounted to the housing; and
    a camera mounted on the housing in an alignment suitable for imaging a surface of a barrel illuminated by the light emitting diode.

14. The measurement device of claim 1, wherein the caliper comprises one or more changeable extensions for changing a distance between the first and second measurement probes.

15. The measurement device of claim 1, and further comprising:
    a plurality of gliders mounted on an outer surface of the housing.

16. The measurement device of claim 1, and further comprising:
    a shaft having a distal end connected to the proximal end of the housing, wherein the shaft has measurement indicia at distance intervals along a length of the shaft.

17. The measurement device of claim 1, where the linkage is a bell-crank linkage that converts radial motion of the first and second measurement probes into axial motion.

18. The measurement device of claim 1, wherein the linkage is pivotably coupled to the housing.

19. The measuring device of claim 1, wherein the cable comprises a first cable coupled to a second cable by a connector, wherein the first cable is detachable from the second cable.

20. The measurement device of claim 1, further comprising an adjustable tip glider coupled to the distal end of the housing.

21. A method of measuring bore diameter in a screw extruder, the method comprising:
    exposing a bore of an extruder barrel, wherein the bore is defined by an inner surface of the extruder barrel;

removing an extruder screw from the bore of the extruder barrel;
inserting a measuring device into the bore, wherein the measuring device comprises:
a housing; and
a caliper mounted for self-centering movement inside the housing, the caliper comprising:
a first measurement probe extending a first direction to contact the inner surface of the extruder barrel;
a second measurement probe extending in a second direction that is substantially opposite of the first direction to contact the inner surface of the extruder barrel;
a linkage coupled to the first and second measurement probes; and
measurement circuitry coupled to the linkage and configured for transmitting a measurement signal based on the relative positions of the first and second measurement probes;
a cable for retracting the first and second measurement probes, wherein the cable is coupled to the caliper and extends from the housing; and
measuring diameter of the bore along a length of the bore via the measuring device.

22. The method of claim 21, wherein the screw extruder is a twin screw extruder, wherein the bore is a first bore, wherein the extruder screw is a first extruder screw, and further comprising:
removing a second extruder screw from a second bore of the extruder barrel, wherein the second bore is adjacent the first bore and is defined by the inner surface of the extruder barrel;
removing the measuring device from the first bore;
inserting the measuring device into the second bore; and
measuring diameter of the second bore along a length of the second bore via the measuring device.

23. The method of claim 21, wherein the extruder barrel comprises first, second, and third barrel sections connected in series via a plurality of flanges, and wherein the diameter of the bore is measured while the first, second, and third barrel sections remain connected.

24. The method of claim 21, wherein the measuring device is angled such that the first and second measurement probes are angled with respect to vertical by between 10 degrees and 50 degrees as the measuring device is moved along the length of the bore and the diameter of the bore is measured.

25. The method of claim 21, and further comprising:
recording indications of bore diameter at regular chronological intervals as the measuring device slides along a length of the bore.

26. The method of claim 21, wherein the screw extruder is a first screw extruder, wherein the bore of the extruder barrel is a first bore of a first extruder barrel, and further comprising:
removing the measuring device from the first bore;
adding one or more extension to the caliper such that a distance between the first measurement probe and the second measurement probe is changed;
adding one or more gliders to an outer surface of the housing; and
inserting the measuring device into a second bore of a second extruder barrel of a second screw extruder, wherein the second bore has a bore diameter different than that of the first bore.

27. The method of claim 21, further comprising: applying a pulling force on the cable to retract the measurement probes; and removing the measuring device from the bore.

28. A measuring device comprising:
a housing;
a caliper positioned inside the housing, the caliper comprising:
first and second measurement probes extending in substantially opposite directions from the housing;
a linkage coupled to the first and second measurement probes; and
measurement circuitry coupled to the linkage and configured for transmitting a measurement signal based on the relative positions of the first and second measurements probes; and
a cable coupled to the caliper and extending from the housing to a location spaced from the housing, for retracting the first and second measurement probes when actuated.

* * * * *